United States Patent Office 3,652,518
Patented Mar. 28, 1972

3,652,518
PROCESS FOR PREPARING ALTERNATING COPOLYMERS OF BUTADIENE AND α-OLEFINE AND HIGH MOLECULAR WEIGHT ALTERNATING COPOLYMERS
Akihiro Kawasaki, Ichihara-shi, Hiroaki Ueda, Chiba-shi, and Isao Maruyama, Ichihara-shi, Japan, assignors to Maruzen Petrochemical Co., Ltd., Tokyo, Japan
Filed Dec. 15, 1969, Ser. No. 884,871
Claims priority, application Japan, Dec. 26, 1968, 43/94,939; Mar. 22, 1969, 44/21,423; Apr. 15, 1969, 44/28,632
Int. Cl. C08d 1/14, 3/02
U.S. Cl. 260—85.3            9 Claims

ABSTRACT OF THE DISCLOSURE

A process for preparing an alternating copolymer of butadiene and α-olefine is disclosed. Said process comprises contacting butadiene and α-olefine in liquid phase with a catalyst system comprising the first component of an organoaluminum compound having the general formula $AlR_3$ (R represents a hydrocarbon radical), the second component being a vanadium compound having no vanadium-halogen linkage and the third component being chlorine, bromine, iodine, a compound thereof or a mixture of them. The copolymerization conditions such as temperature, initial monomer composition, diluent etc. are also disclosed. Physical properties of a novel high molecular weight alternating copolymer of butadiene and an α-olefine having the formula $CH_2=CHR$, wherein R represents a $C_1$–$C_4$ normal or branched chain alkyl radical are also disclosed.

BACKGROUND OF THE INVENTION

Figure 1:
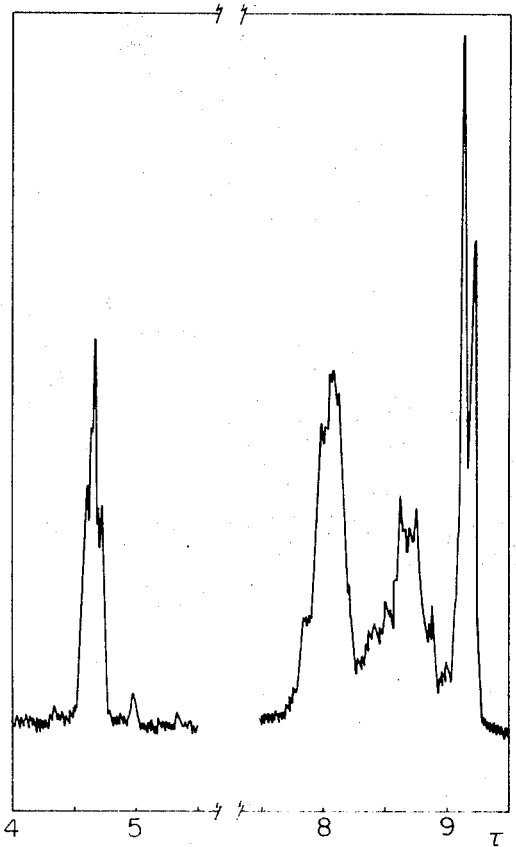

The present invention relates to new alternating copolymers of butadiene and α-olefine and to a process for their preparation.

Because of its chipping and cutting properties and its low skid resistance, the demand for cis-1.4 polybutadiene in the field of automobile tires is not so large as was expected at first. The defects have been ascribed to its unbranched straight-chain structure. In order to overcome these defects, many attempts have been made to produce alternating copolymers of butadiene and α-olefine, for example, butadiene and propylene, butadiene and 1-butene, etc. However, in general, it is not easy to produce even a random copolymer of butadiene and α-olefine by an ionic catalyst.

For instance, German Pat. 1,173,254 claims a process for preparing a copolymer of conjugated diene and monoolefine using vanadium (V) oxychloride as the catalyst, but the examples do not show a copolymerization reaction of butadiene and propylene. German Pat. 1,144,924 claims a process for preparing a copolymer of diene and ethylene or propylene using a catalyst system consisting of a compound of Ti, Zr, Ce, V, Nb, Ta, Cr, Mo or W in which the metal is at least in part below a valency of 3. This patent shows the copolymerization reaction of butadiene and ethylene by titanium tetrachloride-phenylmagnesiumbromide, titanium tetrachloride - lithiumaluminumhydride, titanium tetrachloride-sodium dispersion, zirconium tetrachloride-tintetrabutyl and tetraoctyltitanate-phenylmagnesiumbromide catalyst systems in its examples, but a process for preparing a copolymer of butadiene and propylene is not shown. Belgian Pat. 625,657 also describes a process for preparing co- and terpolymers of butadiene with ethylene and/or α-olefines using a catalyst system containing a hydrocarbon-soluble vanadium compound and an organoaluminum compound containing more than one organic group having strong sterical hindrance, e.g. 3-methylbutyl, cycloalkyl or cyclopentylmethyl, and it claims a process for preparing ethylene-propylene-butadiene terpolymer. However, no example of butadiene-propylene copolymer is shown in it.

On the other hand, British Pat. 1,108,630 shows a process for preparing a rubbery random copolymer of butadiene and propylene by using a three component catalyst system consisting of a trialkylaluminum, iodine and a compound having the general formula of $$TiBr_nCl_{4-n}$$

wherein $n$ is zero or an integer of 1 to 4. A random copolymer of butadiene and propylene was also prepared by using a catalyst system consisting of triethylaluminum, titanium tetrachloride and polypropylene oxide. Polypropylene oxide was used as a randomizer and therefore a copolymer of butadiene and propylene prepared by the catalyst system of triethylaluminum, and titanium tetrachloride was shown to be block-type (paper presented at 2nd Symposium on Polymer Synthesis, Tokyo, Oct. 5, 1968, The Society of Polymer Science, Japan). British Pat. 1,026,615 claims a process for preparing a random copolymer of butadiene and propylene by forming a catalyst system of triethylaluminum and titanium tetrachloride in the presence of propylene, and then adding butadiene to the catalyst system. According to the patent, the propylene content of the copolymer was much higher than that of the copolymer prepared by the catalyst formed after the monomers were mixed. This result is inconsistent with the result described in the above paper. A copolymerization reaction of butadiene and propylene was also carried out by using a catalyst system of triethylaluminum and titanium tetrachloride prepared in propylene and the product was confirmed, by fractional precipitation test, to be a copolymer of butadiene and propylene (Chemistry of High Polymers, The Society of Polymer Science, Japan, 20, 461 (1963)). The content of this paper corresponds to that of the above British patent, but there is no description in it showing that the copolymer should be a random copolymer of butadiene and propylene.

According to the method of British Pat. 982,708, a mixture containing 80–95 mole percent butadiene, the rest being 4-methyl-1-pentene, is polymerized at a temperature in the range 0° to 30° C. by a catalyst system which is the reaction product of vanadium (V) oxychloride with triisobutylaluminum, an aluminumdialkyl monochloride or an aluminum sesquialkyl chloride. The microstructure of the copolymer is not shown in the patent. British Pat. 924,654 describes a process for preparing a copolymer of butadiene and propylene by using an "Alfin" catalyst. The copolymer showed a characteristic infra-red absorption band at 11.95 microns. It was ascribed to tri-substituted ethylene structure. Therefore, the result does not support the assumption that the copolymer should be a random or alternating copolymer of butadiene and propylene.

Consequently, as far as the inventors know, there is no prior art in connection with alternating copolymers of butadiene and α-olefine nor for a process for their preparation.

SUMMARY OF THE INVENTION

In accordance with this invention, it has been discovered that by using a catalyst system the first component of which comprises an organoaluminum compound having the general formula of $AlR_3$ wherein R is a hydrocarbon radical such as an alkyl, aryl or cycloalkyl radical, the second component a vanadium compound having no vanadium-halogen linkage and the third component being chlorine, a chlorine containing compound, bromine, a bromine containing compound, iodine, an iodine containing compound or a mixture of them, alternating copolymers of butadiene and α-olefine can be produced. The new alternating copolymers of this invention are in general rubber-like in character and may be used as polymeric plasticizers, in adhesives and can be vulcanized with sulfur or a sulfur compound to produce vulcanized elastomers. Although, contrary to our expectation the microstructure of butadiene units of all of these alternating copolymers were trans 1.4-configuration, the glass transition temperature of these copolymers was very low and they showed rubber-like elasticity. This result coincides with that of the alternating copolymer of butadiene and acrylonitrile. (Journal of Polymer Science, B7, 411 (1969)). The microstructure of butadiene unit of the copolymer was trans 1.4-configuration, but the copolymer also showed rubber-like elasticity.

Vanadium compounds having no vanadium-halogen linkage are used as the second component of the catalyst system of the present invention. Such vanadium compounds include vanadium alkoxides having the general formula of $V(OR)_4$ wherein R is a hydrocarbon radical such as an alkyl, aryl or cycloalkyl radical; vanadium oxyalkoxides having the general formula of $OV(OR)_3$ wherein R is a hydrocarbon radical such as an alkyl, aryl or cycloalkyl radical; vanadium complex compounds such as dicyclopentadienyl vanadium, cyclopentadienyl tetracarbonyl vanadium, vanadium, triacetylacetonate, vanadium oxydiacetylacetonate; vanadium salts of carboxylic acids such as vanadium oxydiacetate etc.

The chlorine containing compounds, bromine containing compounds and iodine containing compounds that are used as the third component of the catalyst system of the present invention are the compounds of a transition element having the transition element-halogen linkage, such as compounds of the general formula $VX_4$ wherein X is chlorine, bromine or iodine, compounds of the general formula $VOX_3$ wherein X is chlorine, bromine or iodine, compounds of the general formula $OV(OR)_nX_{3-n}$ wherein X is chlorine, bromine or iodine, R is a hydrocarbon radical such as an alkyl, aryl or cycoalkyl and $n$ is a number from 1 to 2, compounds of the general formula $$OV(C_5H_7O_2)_nX_{3-n}$$

wherein X is chlorine, bromine or iodine and $n$ is a number from 1 to 2, compounds of the general formula $V(C_5H_5)_nX_{4-n}$ wherein X is chlorine, bromine or iodine and $n$ is a number from 1 to 2, compounds of the general formula $V(C_5H_5)_2X$ wherein X is chlorine, bromine or iodine, compounds of the general formula $OV(C_5H_5)X_2$ wherein X is chlorine, bromine or iodine, compounds of the general formula $Ti(OR)_nX_{4-n}$ wherein X is chlorine, bromine or iodine, R is a hydrocarbon radical such as an alkyl, aryl or cycloalkyl and $n$ is a number from 1 to 3, compounds of the general formula $Ti(C_5H_5)_2X$ wherein X is chlorine, bromine or iodine, compounds of the general formula $Ti(C_5H_5)X_3$ wherein X is chlorine, bromine or iodine, compounds of the general formula $Ti(C_5H_5)_2X_2$ wherein X is chlorine, bromine or iodine, compounds of the general formula $(C_5H_5)Ti(OR)X_2$ wherein X is chlorine, bromine or iodine and R is a hydrocarbon radical such as an alkyl, aryl or cycloalkyl, compounds of the general formula $(C_5H_5)Ti(OR)_2X$ wherein X is chlorine, bromine or iodine and R is a hydrocarbon radical such as an alkyl, aryl or cycloalkyl, compounds of the general formula $TiX_4$ wherein X is chlorine, bromine or iodine, compounds of the general formula $Zr(OR_2X_2$ wherein X is chlorine, bromine or iodine and R is a hydrocarbon radical such as an alkyl, aryl or cycloalkyl, compounds of the general formula $Zr(OR)_3X$ wherein X is chlorine, bromine or iodine and R is a hydrocarbon radical such as an alkyl, aryl or cycloalkyl, compunds of the general formula $ZrX_4$ wherein X is chlorine, bromine or iodine, compounds of the general formula $CrO_2X_3$ wherein X is chlorine, bromine or iodine, compounds of the general formula $WX_6$ wherein X is chlorine, bromine or iodine, the compounds of the general formula of $FeX_3$ wherein X is chlorine, bromine or iodine, compounds of the general formula of $MoX_5$ wherein X is chlorine, bromine or iodine, etc. and compounds of the elements of Group IIIa, IVa, Va and VIa of Periodic Table having the chemical bond between the element and a halogen atom, such as the compounds of the general formula $BX_3·OR_2$ wherein X is chlorine, bromine or iodine and R is a hydrocarbon radical such as an alkyl, aryl or cycloalkyl, compounds of the general formula $AlR_nX_{3-n}$ wherein X is chlorine, bromine or iodine, R is a hydrocarbon radical such as an alkyl, aryl or cycloalkyl and $n$ is a number from 1 to 2, compounds of the general formula AlOX wherein X is chlorine, bromine or iodine, compounds of the general formula $AlX_3·OR_2$ wherein X is chlorine, bromine or iodine and R is a hydrocarbon radical such as an alkyl, aryl or cycloalkyl, compounds of the general formula $SnX_4$ wherein X is chlorine, bromine or iodine, compounds of the general formula NOX wherein X is chlorine, bromine or iodine, compounds of the general formula $PX_5$ wherein X is chlorine, bromine or iodine, compounds of the general formula $BiX_5$ wherein X is chlorine, bromine or iodine, compounds of the general formula $SOX_2$ wherein X is chlorine, bromine or iodine, the halogenated alkane compounds such as tert-butyl chloride, tert-butyl bromide, tert-butyl iodide, sec-butyl chloride, sec-butyl bromide, sec-butyl iodide, tetrachloromethane, tetrabromomethane, tetraiodomethane, compounds of the general formula RCOX wherein R is a hydrocarbon radical such as an alkyl, aryl or cycloalkyl radical and X is chlorine, bromine or iodine, etc.

The α-olefine of the general formula $CH_2=CHR$ wherein R is a normal chain or branched chain lower alkyl group or a phenyl group is used as a monomer. Examples of such α-olefines are propylene, 1-butene, 1-pentene, 1-hexene, 4-methyl-1-pentene, styrene, etc.

Preparation of the alternating copolymer of butadiene and α-olefine is carried out by contacting butadiene with α-olefine in liquid phase in the presence of the catalyst system described above. The copolymerization reaction is generally carried out in the presence of a liquid organic diluent. Suitable diluents that can be used for the copolymerization reaction include hydrocarbon, such as heptane, octane, isooctane, benzene, toluene, etc., halogenated hydrocarbon, such as methylene chloride, methylene bromide, ethylene chloride, etc. or a mixture of them. The temperature of the copolymerization reaction may be varied from −100° C. to 50° C. and sufficient pressure is employed to keep the monomers in liquid phase. The molar ratio of butadiene to α-olefine in the initial monomer composition may be from 20:80 to 80:20 and more usually be 50:50.

At the completion of the copolymerization reaction, the product is precipitated and deashed with the aid of a methanol-hydrochloric acid mixture. The precipitated product is washed with methanol several times and dried under vacuum. Thereafter the product is extracted with diethyl ether or with methyl ethyl ketone. The diethyl ether or methyl ethyl ketone soluble fraction is collected as an alternating copolymer of butadiene and α-olefine.

DESCRIPTION OF THE PREFERRED EMBODIMENTS

The following examples illustrate the new alternating copolymers of butadiene and α-olefine and the process for preparation thereof in accordance with this invention.

Examples 1–13

In these examples, the usual, dry, air-free technique was employed and 5 milliliters toluene, varying amounts of vanadium (V) oxytriethoxide ($OV(OEt)_3$) solution in toluene (1 molar solution), varying amounts of halogen or halogen containing compounds, varying amounts of triisobutyl aluminum solution in toluene (1 molar solution) and a mixture of 2 milliliters liquid propylene, 2-milliliters liquid butadiene and 2 milliliters toluene were put successively in a 25 milliliter glass bottle held in a low temperature bath at −78° C. Thereafter the bottle was sealed and allowed to copolymerize at −30° C. for 16 hours. The product purified by the process described above was extracted successively with methyl ethyl ketone and diethyl ether. The methyl ethyl ketone soluble fraction and the methyl ethyl ketone insoluble, diethyl ether soluble fraction were both collected as alternating copolymers of butadiene and propylene. The former fraction was a low molecular weight copolymer and the latter fraction was a high molecular weight copolymer whose intrinsic viscosity was higher than 0.1 dl./g. in chloroform at 30° C. The copolymers showed tacky and rubber-like properties.

The following results support the conclusion that the copolymer is an alternating copolymer of butadiene and propylene.

(1) The composition of the copolymer according to the NMR analysis substantially agrees with the calculated value for the 1:1 copolymer of butadiene and propylene. Copolymer compositions were determined by measuring the ratio of peak area at $4.65\tau$ of butadiene unit to that of doublet at $9.11\tau$ and $9.20\tau$ of propylene unit.

(2) The copolymerization reaction gives 1:1 copolymer over a wide range of initial monomer composition.

(3) The copolymerization reaction gives 1:1 copolymer independently of polymerization time.

(4) Although the microstructure of butadiene unit in the copolymer is trans 1.4-configuration, the crystallization sensitive bands of trans 1.4 polybutadiene at 1335 cm.$^{-1}$, 1235 cm.$^{-1}$, 1121 cm.$^{-1}$, 1054 cm.$^{-1}$ and 773 cm.$^{-1}$ do not appear in its infra-red spectrum.

This means at least that the length of the butadiene-butadiene repeating unit of the copolymer is not so long as to be detected by its infra-red spectrum.

(5) The 1155 cm.$^{-1}$ band of propylene homopolymer is not shown in its infra-red spectrum and a new broad band appears at 1065 cm.$^{-1}$.

This means at least that the length of the propylene-propylene repeating unit of the copolymer is not so long as to be detected by its infra-red spectrum.

(6) Two new bands at 890 cm.$^{-1}$ and 1640 cm.$^{-1}$ are observed in the infra-red spectrum of the methyl ethyl ketone soluble fraction of the copolymer. The 890 cm.$^{-1}$ band may be ascribed to the CH out of plane vibration mode of the terminal $CH_3$—C=$CH_2$ group of the copolymer and the 1640 cm.$^{-1}$ band may also be ascribed to the C=C stretching mode of the group.

(7) The absorption band at 967 cm.$^{-1}$ corresponding to the CH out of plane deformation mode of trans 1.4 polybutadiene shifts to high frequency side by about 5 cm.$^{-1}$. This result suggests the existence of a butadiene-propylene unit in the copolymer.

Figure 2:
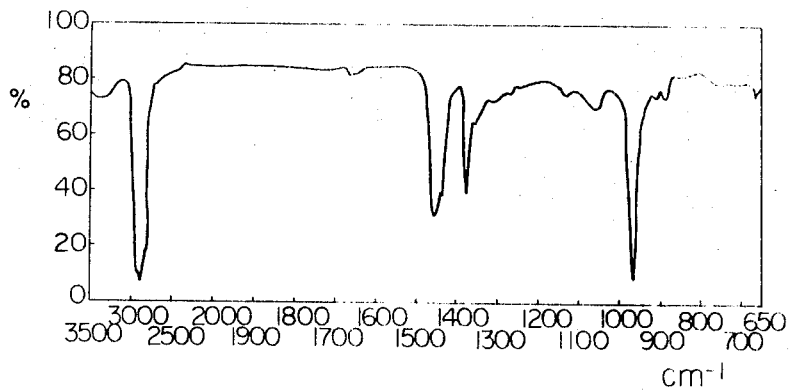

FIG. 1 shows the NMR spectrum of the methyl ethyl ketone insoluble, diethyl ether soluble fraction of the alternating copolymer of butadiene and propylene. FIG. 2 shows the infra-red spectrum of the fraction.

The results are summarized in Table 1. As can be seen in Ref. 1 of Table 1, the catalyst system involving no halogen compound gives no alternating copolymer of butadiene and propylene.

100 parts by weight of the methyl ethyl ketone insoluble, diethyl ether soluble fraction of the alternating copolymer of butadiene and propylene prepared by the method of above Example No. 3 were mixed on a laboratory roll mixer, with 2 parts of sulphur, 5 parts of zinc oxide, 1 part of tetramethyl thiuram disulfide, 1 part of 2,5-di-tert-butyl hydroquinone, 40 parts of HAF carbon black. The mixture thus obtained was vulcanized in a press for 20 minutes at 140° C. Tensile strength of the sample was 180 kg./cm.$^2$.

TABLE 1

| Example No. | Monomers[1] | | Diluent, toluene (ml.) | Catalysts[2] | | | Reaction conditions | | Alternating copolymer[3] | | | | |
|---|---|---|---|---|---|---|---|---|---|---|---|---|---|
| | Pr (ml.) | BD (ml.) | | AIi-Bu₃ soln. (ml.) | VO(OEt)₃ soln. (ml.) | Halogen compound | Temp. (°C.) | Time (hr.) | MEK soluble fraction | | MEK insoluble, diethyl ether soluble fraction | | |
| | | | | | | | | | Yield (g.) | [η] (dl./g.) | Tg (°C.) | Yield (g.) | [η] (dl./g.) | Tg (°C.) |
| 1 | 2 | 2 | 5 | 2.5 | 0.9 | VOCl₃, 0.10 (ml.) | −30 | 16 | 0.3 | — | — | 0.9 | — | — |
| 2 | 2 | 2 | 5 | 2.5 | 0.75 | VOCl₃, 0.25 (ml.) | −30 | 16 | 0.7 | — | — | 1.2 | — | — |
| 3 | 2 | 2 | 5 | 2.5 | 0.6 | VOCl₃, 0.40 (ml.) | −30 | 16 | 0.5 | 0.1 | −76 | 1.4 | 0.5 | −76 |
| 4 | 2 | 2 | 5 | 2.5 | 1.0 | tert-BuCl, 0.13 (ml.) | −30 | 16 | 0.8 | — | — | 1.0 | — | — |
| 5 | 2 | 2 | 5 | 2.5 | 1.0 | tert-BuBr, 0.14 (ml.) | −30 | 16 | 0.9 | — | — | 1.2 | — | — |
| 6 | 2 | 2 | 5 | 2.5 | 1.0 | I₂, 0.152 (g.) | −30 | 16 | 0.7 | 0.1 | −75 | 1.3 | 0.3 | −76 |
| 7 | 2 | 2 | 5 | 2.5 | 1.0 | Br₂, 0.03 (ml.) | −30 | 16 | 0.6 | 0.1 | −75 | 1.2 | 0.5 | −76 |
| 8 | 2 | 2 | 5 | 2.5 | 1.0 | AlCl₃, 0.053 (g.) | −30 | 16 | 0.7 | 0.1 | −76 | 1.1 | 0.4 | −76 |
| 9 | 2 | 2 | 5 | 2.5 | 1.0 | PCl₅, 0.050 (g.) | −30 | 16 | 0.8 | — | — | 1.2 | — | — |
| 10 | 2 | 2 | 5 | 2.5 | 1.0 | SnCl₄, 0.035 (ml.) | −30 | 16 | 1.0 | — | — | 1.1 | — | — |
| 11 | 2 | 2 | 5 | 2.5 | 1.0 | SOCl₂, 0.043 (ml.) | −30 | 16 | 0.5 | — | — | 0.8 | — | — |
| 12 | 2 | 2 | 5 | 2.5 | 1.0 | NOCl, 0.055 (ml.) | −30 | 16 | 0.9 | 0.1 | −77 | 0.7 | — | — |
| 13 | 2 | 2 | 5 | 2.5 | 1.0 | TiCl₄, 0.30 (ml.) | −30 | 16 | 0.7 | — | — | 1.1 | 0.4 | −76 |
| Ref. 1 | 2 | 2 | 5 | 2.5 | 1.0 | — | −30 | 16 | 0 | — | — | 0 | — | — |

[1] Pr: liquid propylene; BD: liquid butadiene.
[2] AIi-Bu₃ soln.: 1 molar triisobutylaluminum solution in toluene; OV(OEt)₃ soln.: 1 molar OV(OEt)₃ solution in toluene; VOCl₃: 1 molar VOCl₃ solution in toluene; tert-BuCl: tert-butylchloride; tert-BuBr: tert-butylbromide; TiCl₄: 1 molar TiCl₄ solution in toluene.
[3] [η]: intrinsic viscosity in chloroform at 30° C.; Tg: glass transition temperature.

Examples 14–16

In these examples, the usual, dry, air-free technique was employed and 5 milliliters toluene, 1.00 milliliter vanadium (V) oxytriethoxide (OV(OEt)$_3$) solution in toluene (1 molar solution), a mixture of varying amounts of triisobutylaluminum solution in toluene (1 molar solution) and varying amounts of ethylaluminum dichloride or diethylaluminum monochloride solution in toluene (1 molar solution) and a mixture of 2 milliliters liquid propylene, 2 milliliters liquid butadiene and 2 milliliters toluene were put successively in a 25 milliliter glass bottle held in a low temperature bath at −78° C. Thereafter the bottle was sealed and allowed to copolymerize at −30° C. for 16 hours. The product purified by the process described above was extracted successively with methyl ethyl ketone and diethyl ether.

The results are summarized in Table 2. As can be seen in Ref. 2 and 3 of Table 2, even when the molar ratio of Al to V is 2.5:1, the catalyst system of OV(OEt)$_3$ and AlEt$_2$Cl or AlEtCl$_2$ gives no alternating copolymer of butadiene and propylene.

toluene (1 molar solution), varying amounts of halogen or halogen containing compound, 2.5 milliliters triisobutylaluminum solution in toluene (1 molar solution), 3 milliliters styrene and 2 milliliters liquid butadiene were put successively in a 25 milliliter glass bottle held in a low temperature bath at −78° C. Thereafter the bottle was sealed and allowed to copolymerize at −30° C. for 16 hours. The product purified by the process described above was extracted with diethyl ether. The diethyl ether soluble fraction was collected as an alternating copolymer of butadiene and styrene. The alternating copolymer was a rubber-like elastomer.

The following results support the conclusion that the copolymer should be an alternating copolymer of butadiene and styrene.

TABLE 3

| Example No. | Monomers[1] | | Diluent, toluene (ml.) | Catalysts[2] | | | | Reaction conditions | | Alternating copolymer (g.) |
|---|---|---|---|---|---|---|---|---|---|---|
| | Sty (ml.) | BD (ml.) | | Ali-Bu$_3$ soln. (ml) | OV(OEt)$_3$ soln. (ml.) | Halogen compound | Ml. | Temp. (° C.) | Time (hr.) | |
| 18 | 3 | 2 | 5 | 2.5 | 1.0 | Br$_2$ | 0.03 | −30 | 16 | 1.2 |
| 19 | 3 | 2 | 5 | 2.5 | 1.0 | tert-BuCl | 0.13 | −30 | 16 | 0.9 |
| 20 | 3 | 2 | 5 | 2.5 | 1.0 | TiCl$_4$ | 0.30 | −30 | 16 | 1.1 |

[1] Sty: styrene; BD: liquid butadiene.
[2] Ali-Bu$_3$ soln.: 1 molar triisobutylaluminum solution in toluene; OV(OEt)$_3$ soln.: 1 molar OV(OEt)$_3$ solution in toluene; OV(OEt)$_3$ soln.: 1 molar OV(OEt)$_3$ solution in toluene; tert-BuCl: tert-butyl chloride; TiCl$_4$: 1 molar TiCl$_4$ solution in toluene.

(1) The composition of the copolymer according to the NMR analysis substantially agrees well with the calculated value for the 1:1 copolymer of butadiene and styrene.

(2) The copolymerization reaction gives 1:1 copolymer independently of polymerization time.

(3) The NMR spectrum of the copolymer shows a strong peak at 8.03τ ascribing to the methylene groups

TABLE 2

| Example No. | Monomers[1] | | Diluent, toluene (ml.) | Ali-Bu$_3$ soln.(ml.) | Catalysts[2] | | | Reaction conditions | | Alternating copolymer | |
|---|---|---|---|---|---|---|---|---|---|---|---|
| | Pr (ml.) | BD (ml.) | | | OV(OEt)$_3$ soln. (ml. | Halogen compound | Ml. | Temp. (° C.) | Time (hr.) | MEK soluble fraction (g.) | MEK insoluble, diethyl ether soluble fraction (g.) |
| 14 | 2 | 2 | 5 | 2.0 | 1.0 | AlEt$_2$Cl | 0.5 | −30 | 16 | 0.12 | 0.45 |
| 15 | 2 | 3 | 5 | 2.25 | 1.0 | AlEtCl$_2$ | 0.25 | −30 | 16 | 0.22 | 0.93 |
| 16 | 2 | 2 | 5 | 2.0 | 1.0 | AlEtCl$_2$ | 0.5 | −30 | 16 | 0.15 | 0.41 |
| Ref. 2 | 2 | 2 | 5 | | 1.0 | AlEt$_2$Cl | 2.5 | −30 | 16 | 0 | 0 |
| Ref. 3 | 2 | 2 | 5 | | 1.0 | AlEtCl$_2$ | 2.5 | −30 | 16 | 0 | 0 |

[1] Pr: liquid propylene; BD: liquid butadiene.
[2] Ali-Bu soln.: 1 molar triisobutylaluminum solution in toluene; OV(OEt)$_3$ soln.: 1 molar OV(OEt)$_3$ solution in toluene; AlEt$_2$Cl: 1 molar AlEt$_2$Cl solution in toluene; AlEtCl$_2$: 1 molar AlEtCl$_2$ solution in toluene.

Example 17

The usual, dry, air-free technique was employed and 5 milliliters toluene, 0.085 milliliter chromyl chloride, 1.0 milliliter vanadium (V) oxytriethoxide (OV(OEt)$_3$) solution in toluene (1 molar solution), 2.6 milliliters triisobutylaluminum solution in toluene (1 molar solution), a mixture of 2 milliliters liquid propylene and 2 milliliters toluene and 2 milliliters liquid butadiene were put successively in a 25 milliliter glass bottle held in a low temperature bath at −78° C. Thereafter the bottle was sealed and allowed to copolymerize at −30° for 17.5 hours. The product purified by the process described above was extracted with diethyl ether. The diethyl ether soluble fraction was collected as an alternating copolymer of butadiene and propylene. The yield of the alternating copolymer was 1.63 g. Intrinsic viscosity of the copolymer was 0.3 dl./g. in chloroform at 30° C.

Examples 18–20

In these examples, the usual, dry, air-free technique was employed and 5 milliliters toluene, 1.0 milliliter vanadium (V) oxytriethoxide (OV(OEt)$_3$) solution in of butadiene-styrene repeating unit, but the 7.95τ peak ascribing to the methylene groups of 1.4 polybutadiene appears as a very weak peak. The results substantially deny the existence of butadiene-butadiene repeating unit.

Figure 3:
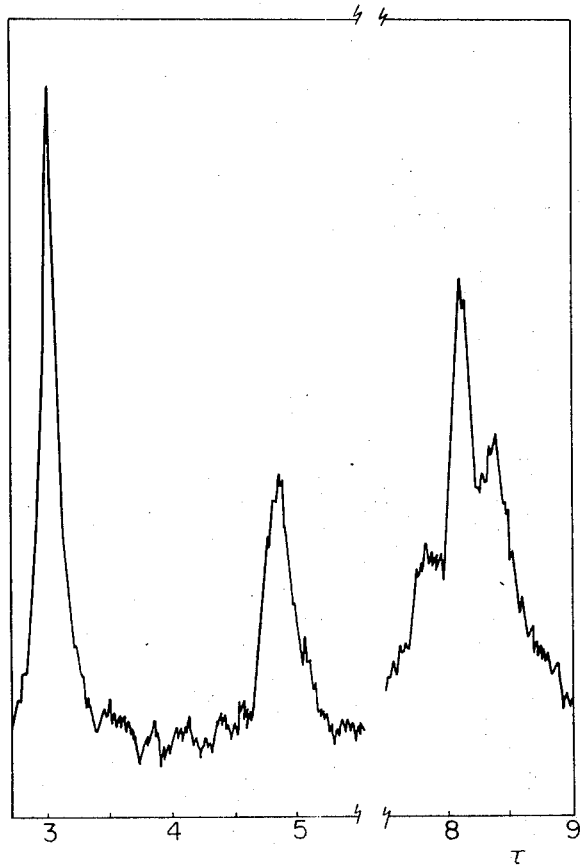
Figure 4:
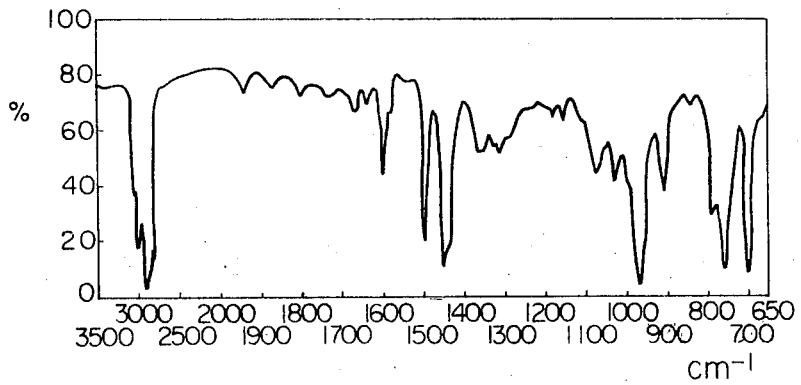

FIG. 3 shows the NMR spectrum of the alternating copolymer of butadiene and styrene. FIG. 4 shows the infra-red spectrum of the copolymer.

The results are summarized in Table 3.

Example 21

The usual, dry, air-free technique was employed and 7 milliliters toluene, 0.08 milliliter chromyl chloride, 1.05 milliliters vanadium (V) oxytriethoxide (OV(OEt)$_3$) solution in toluene (1 molar solution), 2.6 milliliters triethylaluminum solution in toluene (1 molar solution), 3 milliliters styrene and 2 milliliters liquid butadiene were put successively in a 25 milliliter glass bottle held in a low temperature bath at −78° C. Thereafter the bottle was sealed and allowed to copolymerize at −30° for 17 hours. The product purified by the process described above was extracted with diethyl ether. The diethyl ether soluble fraction was collected as an alternating copolymer of butadiene and styrene. The yield of the alternating copolymer was 0.04 g.

Examples 22-26

The usual, dry, air-free technique was employed and 9 milliliters toluene, 0.3 milliliter vanadium (V) oxytriethoxide (OV(OEt)$_3$) solution in toluene (1 molar solution), varying amounts of halogen containing compound, 1.0 milliliter triisobutylaluminum solution in toluene (1 molar solution) and a mixture of 2 milliliters liquid 1-butene and 2 milliliters liquid butadiene were put successively in a 25 milliliter glass bottle held in a low temperature bath at −78° C. Thereafter the bottle was sealed and allowed to copolymerize at −30° C. for 16 hours. The product purified by the process described above was extracted successively with methyl ethyl ketone and diethyl ether. The methyl ethyl ketone soluble fraction and the methyl ethyl ketone insoluble, diethyl ether soluble fraction were both collected as an alternating copolymer of butadiene and 1-butene. The former fraction was a low molecular weight copolymer and the latter fraction was a high molecular weight copolymer.

The following results support the conclusion that the copolymer should be an alternating copolymer of butadiene and 1-butene.

(1) The composition of the copolymer according to the NMR analysis substantially agrees well with the calculated value for the 1:1 copolymer of butadiene and 1-butene. Copolymer compositions were determined by measuring the ratio of peak area at 4.65τ of butadiene unit to that of doublet at 9.06τ and 9.15τ of 1-butene unit.

(2) The copolymerization reaction gives 1:1 copolymer over a wide range of initial monomer composition.

(3) The copolymerization reaction gives 1:1 copolymer independently of polymerization time.

(4) Although the microstructure of butadiene unit in the copolymer is trans 1,4-configuration, the crystallization sensitive bands of trans 1,4-polybutadiene at 1335 cm.$^{-1}$, 1235 cm.$^{-1}$, 1121 cm.$^{-1}$, 1054 cm.$^{-1}$ and 773 cm.$^{-1}$ do not appear in its infra-red spectrum.

(5) A new band appears at 1065 cm.$^{-1}$. The band corresponds to the 1065 cm.$^{-1}$ band of the alternating copolymer of butadiene and propylene.

(6) The absorption band at 967 cm.$^{-1}$ corresponding to the CH out of plane deformation mode of trans 1,4-polybutadiene shifts to the high frequency side by about 5 cm.$^{-1}$.

Figure 5:
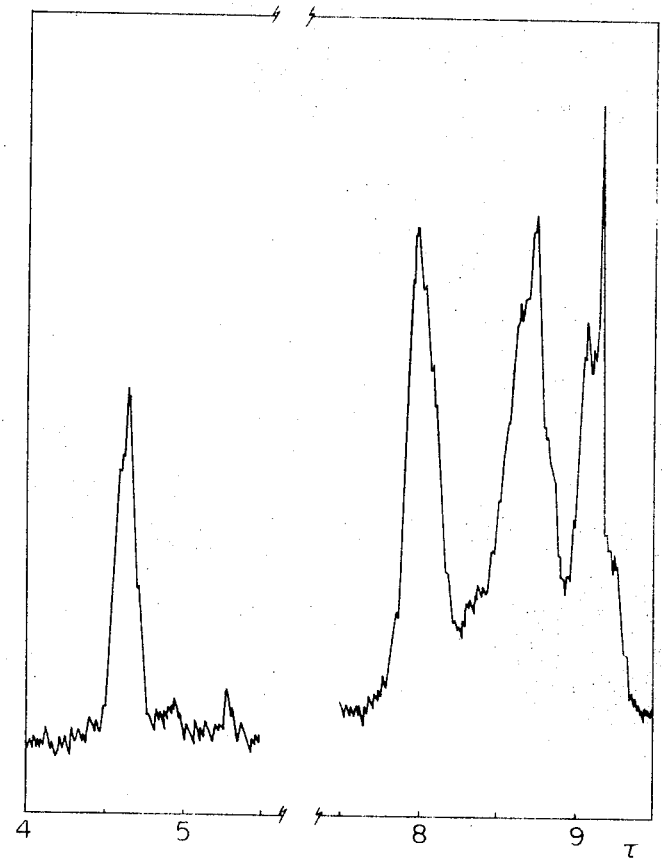
Figure 6:
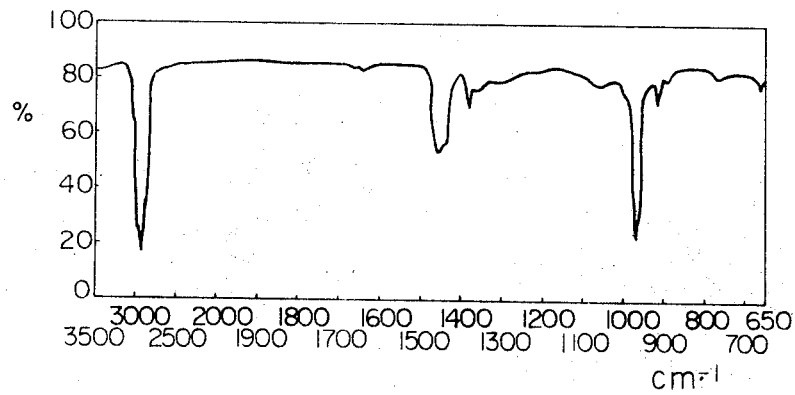

FIG. 5 shows the NMR spectrum of the methyl ethyl ketone soluble fraction of the alternating copolymer. FIG. 6 shows the infra-red spectrum of the methyl ethyl ketone insoluble, diethyl ether soluble fraction of the alternating copolymer.

The results are summarized in Table 4.

100 parts by weight of the methyl ethyl ketone insoluble, diethyl ether soluble fraction of the alternating copolymer or butadiene and 1-butene prepared by the method of Example 26 were mixed on a laboratory roll mixer, with 2 parts of sulphur, 5 parts of zinc oxide, 1 part of tetramethyl thiuram disulfide, 1 part of 2,5-di-tert-butyl hydroquinone and 40 parts of HAF carbon black. The mixture thus obtained was vulcanized in a press for 20 minutes at 140° C. Tensile strength of the sample was 160 kg./cm.$^2$.

Examples 27-29

The usual, dry, air-free technique was employed and 9 milliliters toluene, 0.3 milliliter vanadium (V) oxytriethoxide (OV(OEt)$_3$) solution in toluene (1 molar solution), 0.21 millimol diethyl ether complex of aluminum chloride (AlCl$_3$·OEt$_2$), 1.0 milliliter triisobutylaluminum solution in toluene (1 molar solution) and a mixture of 2 milliliters liquid butadiene and varying amounts of liquid α-olefine were put successively in a 25 milliliter glass bottle held in a low temperature bath at −78° C. Thereafter the bottle was sealed and allowed to copolymerize at −30° C. for 16 hours. The product purified by

TABLE 4

| Example No. | Monomers [1] | | Diluent, toluene (ml.) | Catalysts [2] | | | | Reaction conditions | | Alternating copolymer [3] | | | | | |
|---|---|---|---|---|---|---|---|---|---|---|---|---|---|---|---|
| | | | | | | | | | | MEK soluble fraction | | | MEK insoluble, diethyl ether soluble fraction | | |
| | 1-Bu (ml.) | BD (ml.) | | Ali-Bu$_3$ soln. (ml.) | OV(OEt)$_3$ soln. (ml.) | Halogen compound | Mmol | Temp. (°C.) | Time (hr.) | Yield (g.) | (η) (dl/g.) | Tg (°C.) | Yield (g.) | (η) (dl/g.) | Tg (°C.) |
| 22 | 2 | 2 | 9 | 1.0 | 0.3 | AlEtCl$_2$ | 0.30 | −30 | 16 | 0.82 | | | 0.90 | | |
| 23 | 2 | 2 | 9 | 1.0 | 0.3 | SnCl$_4$ | 0.15 | −30 | 16 | 0.33 | | | 0.43 | | |
| 24 | 2 | 2 | 9 | 1.0 | 0.3 | AlCl$_3$·OEt$_2$ | 0.21 | −30 | 16 | 1.03 | 0.1 | −75 | 1.17 | 0.3 | −76 |
| 25 | 2 | 2 | 9 | 1.0 | 0.3 | CuI$_2$ | 0.30 | −30 | 16 | 0.29 | | | 1.02 | 0.4 | −75 |
| 26 | 2 | 2 | 9 | 1.0 | 0.3 | TiCl$_4$ | 0.15 | −30 | 16 | 0.78 | 0.1 | −75 | 1.09 | | |
| Ref. | | 2 | 9 | 1.0 | 0.3 | | | −30 | 16 | 0 | | | 0 | | |

[1] 1-Bu: liquid 1-butene; BD: liquid butadiene.
[2] Ali-Bu$_3$ soln.: 1 molar triisobutylaluminum solution in toluene; OV(OEt)$_3$ soln.: 1 molar OV(OEt)$_3$ solution in toluene.
[3] (η): intrinsic viscosity in chloroform at 30° C.; Tg: glass transition temperature.

the process described above was extracted successively with methyl ethyl ketone and diethyl ether. The methyl ethyl ketone soluble fraction and the methyl ethyl ketone insoluble, diethyl ether soluble fraction were both collected as an alternating copolymer of butadiene and α-olefine. The former fraction was a low molecular weight copolymer and the latter one was a high molecular weight copolymer whose intrinsic viscosity was higher than 0.1 dl./g. in chloroform at 30° C. From their NMR and infra-red spectra these fractions were determined to be an alternating copolymer of butadiene and α-olefine, respectively.

The results are summarized in Table 5.

TABLE 5

| | Monomers [1] | | Diluent, toluene (ml.) | Catalysts [2] | | | Reaction conditions | | Alternating copolymer [3] | | | | | |
|---|---|---|---|---|---|---|---|---|---|---|---|---|---|---|
| | | | | | | | | | MEK soluble fraction | | | MEK insoluble, diethyl ether soluble fraction | | |
| Ex. No. | α-Olefine (ml.) | BD (ml.) | | Al-iBu₃ soln. (ml.) | VO(OEt)₃ soln. (ml.) | AlCl₃·OEt₂ (mmol) | Temp. (° C.) | Time (hr.) | Yield (g.) | [η] (dl/g.) | Tg (° C.) | Yield (g.) | [η] (dl/g.) | Tg (° C.) |
| 27 | 1-P (2.9) | 2 | 9 | 1.0 | 0.3 | 0.21 | −30 | 16 | 0.36 | 0.1 | −75 | 1.00 | 0.4 | −74 |
| 28 | 4-M-1-P (3.3) | 2 | 9 | 1.0 | 0.3 | 0.21 | −30 | 16 | 0.41 | 0.1 | −57 | 0.84 | 0.3 | −58 |
| 29 | 1-H (3.3) | 2 | 9 | 1.0 | 0.3 | 0.21 | −30 | 16 | 0.38 | 0.1 | −75 | 2.00 | 0.4 | −76 |

[1] 1-P: liquid 1-pentene; 4-M-1-P: liquid 4-methyl-1-pentene; 1-H: liquid 1-hexene.
[2] Al-iBu₃ soln.: 1 molar triisobutylaluminum solution in toluene; OV(OEt)₃ soln.: 1 molar OV(OEt)₃ solution in toluene.
[3] [η]: intrinsic viscosity in chloroform at 30° C.; Tg: glass transition temperature.

What is claimed is:

1. A process for preparing a 1:1 copolymer of butadiene and an alpha-olefin having alternating butadiene and alpha-olefin units, said alpha-olefin having the general formula $CH_2=CHR$, wherein R represents a phenyl radical or a $C_1$ to $C_4$ normal or branched chain lower alkyl radical, which comprises contacting a mixture of butadiene and said alpha-olefin in liquid phase with a catalyst system comprising a first component of an organoaluminum compound having the general formula $AlR_3'$ wherein R' is a hydrocarbon radical selected from the group consisting of alkyl, aryl and cycloalkyl, a second component of a vanadium alkoxide having the general formula $V(OR')_4$ wherein R' is as defined above or a vanadium oxyalkoxide having the general formula $OV(OR')_3$ wherein R' is as defined above and a third component of chlorine, bromine, iodine, a compound of a transition element having a linkage of a transition element—X, wherein X represents chlorine, bromine, or iodine, a compound of element of Group III–A, IV–A, VA or VIA of the Periodic Table having a linkage of said element—X, wherein X is as defined above or a mixture thereof and wherein the atomic ratio of aluminum contained in said first component, vanadium contained in said second component and a halogen contained in said third component is approximately 2–4.1/1/0.3–2.1.

2. A process as claimed in claim 1 wherein the molar ratio of butadiene to α-olefine in the initial monomer composition is within the range from 20:80 to 80:20.

3. A process as claimed in claim 1, wherein the polymerization temperature is within the range from −100° C. to 50° C.

4. A process as claimed in claim 1, wherein the copolymerization reaction is carried out in the presence of a diluent selected from a hydrocarbon, a halogenated hydrocarbon or a mixture thereof.

5. A process as claimed in claim 1, wherein said organoaluminum compound is triethylaluminum or triisobutylaluminum.

6. A process as claimed in claim 5, wherein said process is carried out at a temperature from −100° C. to 50° C. in the presence of a diluent selected from a hydrocarbon, a halogenated or a mixture thereof using a feed composition having a molar ratio of butadiene to said alpha-olefin of from 20:80 to 80:20.

7. A process as claimed in claim 6, wherein said molar ratio of butadiene to said alpha-olefin is substantially 50:50.

8. A process as claimed in claim 1, wherein R is an alkyl group.

9. A 1:1 copolymer of butadiene and an alpha-olefin having alternating butadiene and alpha-olefin units, said alpha-olefin having the general formula $CH_2=CHR$, wherein R represents a $C_1$–$C_4$ normal or branched chain alkyl group, and said copolymer having an intrinsic viscosity of from higher than 0.1 to about 0.5 dl./g. in chloroform at 30° C.

References Cited

UNITED STATES PATENTS

| 3,457,250 | 7/1969 | Gaeth | 260—94.3 |
| 3,506,632 | 4/1970 | Henderson | 260—85.3 |
| 3,317,496 | 5/1967 | Natta et al. | 260—88.2 |
| 3,407,185 | 10/1968 | Natta et al. | 260—85.3 |
| 3,265,765 | 8/1966 | Holden et al. | 260—876 |

FOREIGN PATENTS

| 716,173 | 8/1965 | Canada | 260—94.3 |

JOSEPH L. SCHOFER, Primary Examiner

R. A. GAITHER, Assistant Examiner

U.S. Cl. X.R.

260—82.1, 878, 879